July 14, 1970 G. H. HOWLETT ET AL 3,520,032
TENDON ANCHORAGE

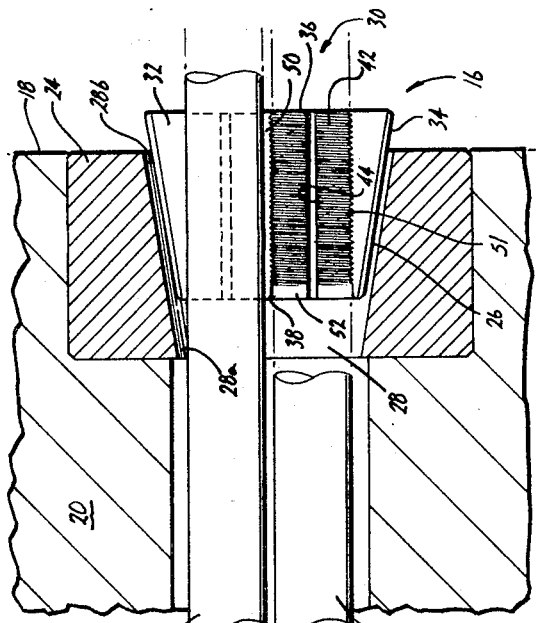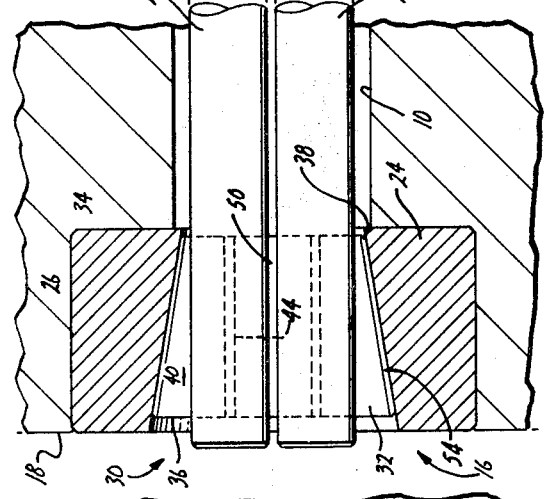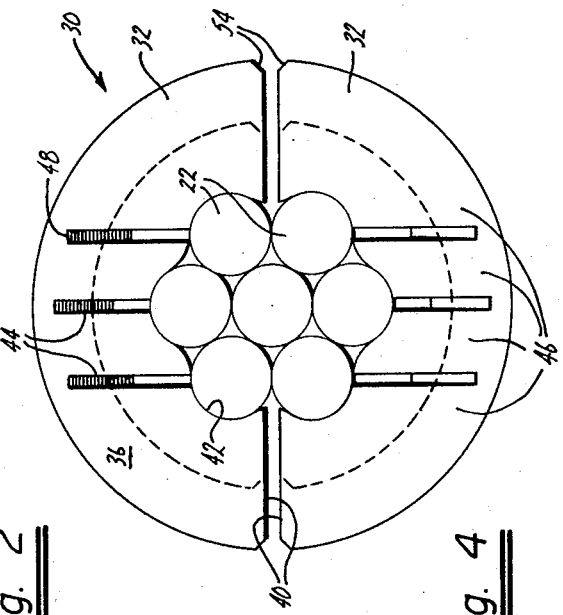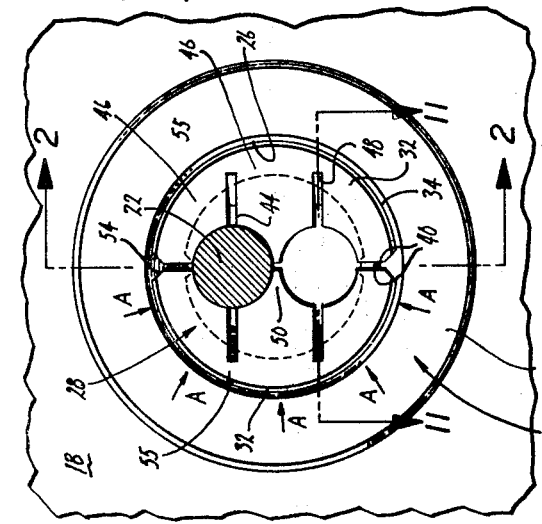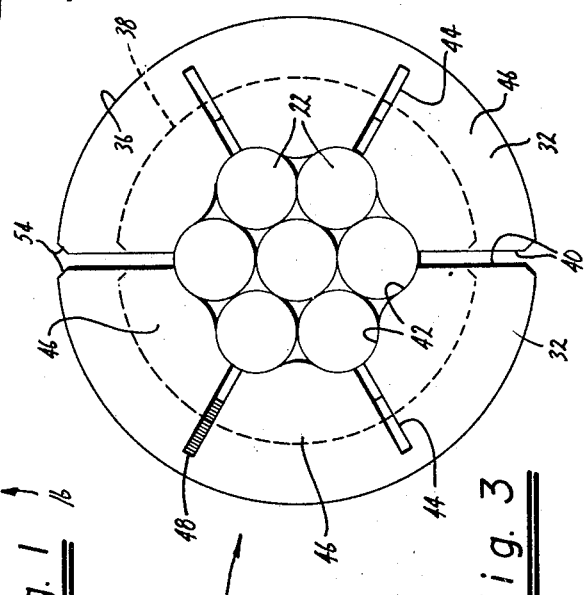

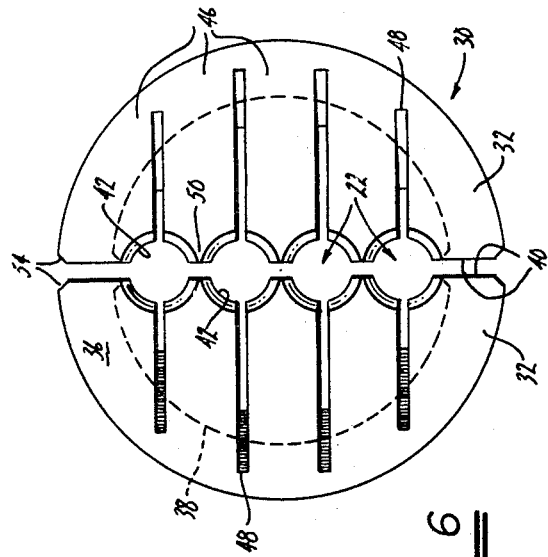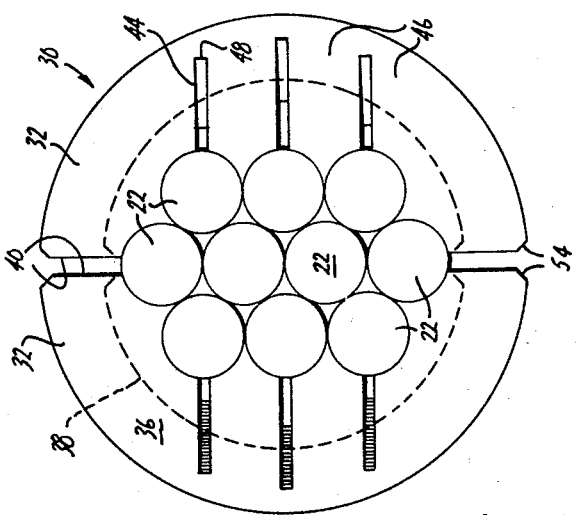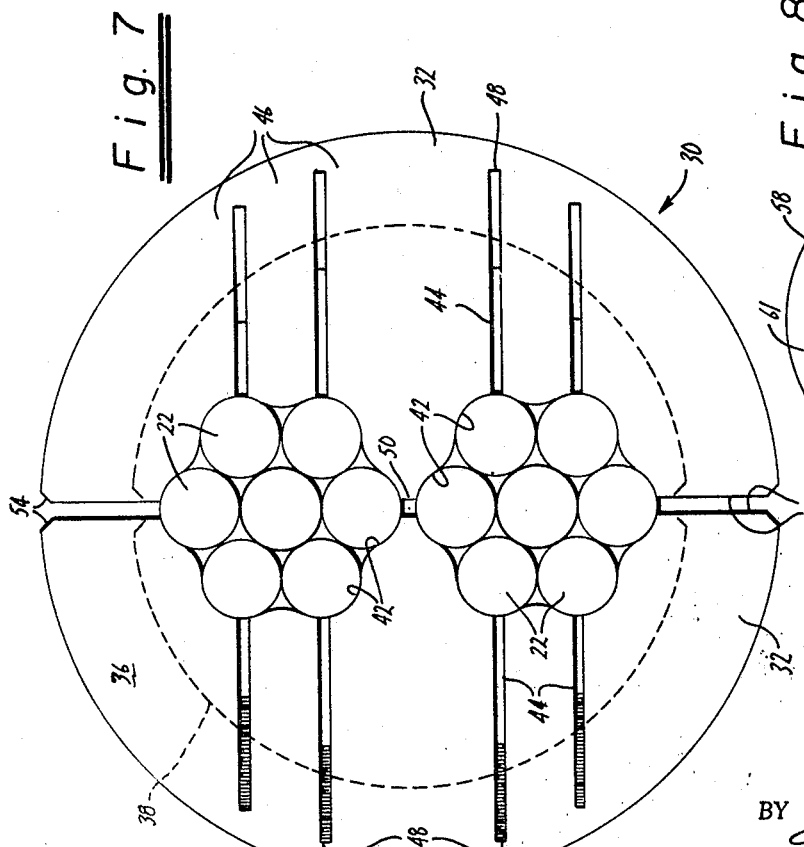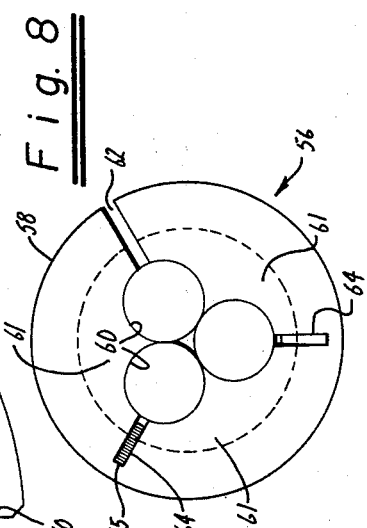

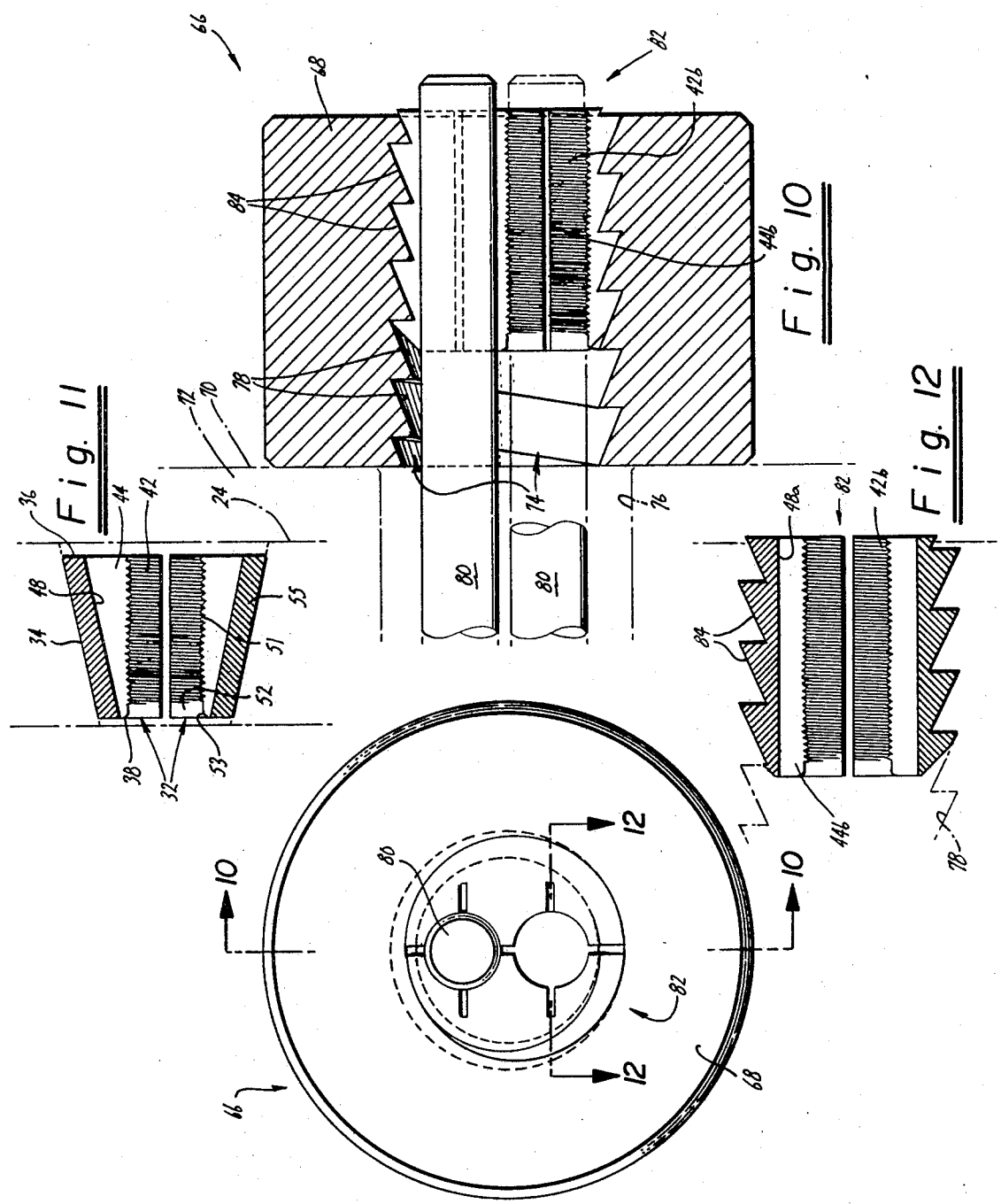

Filed Aug. 12, 1968 4 Sheets-Sheet 4

INVENTORS
George H. Howlett
BY James W. Howlett
Warren, Rubin
Brucker & Chickering
Attorneys United States Patent Office 3,520,032
Patented July 14, 1970

3,520,032
TENDON ANCHORAGE
George H. Howlett, Oakland, and James W. Howlett, Richmond Annex, Calif., assignors to Howlett Machine Works, a corporation of California
Filed Aug. 12, 1968, Ser. No. 751,951
Int. Cl. E04c 3/10, 3/26, 5/08
U.S. Cl. 24—122.6                                   18 Claims

ABSTRACT OF THE DISCLOSURE

A tendon anchorage primarily for use in pre-tensioning and post-tensioning concrete in which the anchorage includes an axially convergent bore and a tendon gripping wedge disposed in the bore. The wedge includes interiorly located gripping surfaces for engaging the tendon and a slit extending from a peripheral wall of the wedge to the gripping portion. One or more grooves are spaced from the slit and extend from the gripping portion toward the peripheral wall to increase the flexure of segments of the wedge defined by the grooves when forces in a radial direction act on the peripheral wall of the wedge. It is preferable that the grooves terminate short of the peripheral wall to provide an axially extending hinge. Alternatively, a groove may extend through to the peripheral wall over a portion of the axial length to provide the desired flexure. Flexure enhances the gripping force, and when a plurality of tensioned tendons are used, gripping forces are additive to increase the gripping force per tendon over what the force would be if only one tendon were provided.

BACKGROUND OF THE INVENTION

Today, tendon anchorages are widely employed for anchoring one or more tendons, usually in connection with the prestressing of concrete and more particularly in connection with the post-tensioning of concrete. One class of tendon anchorages which has become popular employs a plurality of tendon gripping wedges disposed in a tapered bore of an anchorage member. An example of such a tendon anchorage is disclosed in the commonly owned patent application bearing Ser. No. 707,067, filed Feb. 21, 1968, now Pat. No. 3,449,876. The anchorage disclosed in that patent application is particularly well suited for use in conjunction with the anchoring of large numbers, as many as 36 or more, of tendons. Applications requiring such large numbers are frequently encountered in the construction of large buildings, bridges (either in the concrete work or to anchor suspension cables), overhead highway sections, etc.

The tendon anchorage of the device disclosed in the above-referred patent application may employ a relatively large number of tendon gripping wedges which must be carefully assembled prior to the tensioning of the tendons and the pre-stressing of the concrete section to which they are applied. When in place, the wedges subject the tendons to gripping forces which result from the tension in each tendon and which are additive so that each tendon is subjected to a gripping force which is many times greater than the gripping force it would be subjected to if the anchorage had only one tendon. The addition of the gripping force from each tendon to all others (disregarding frictional losses) is obtained through the use of individual wedges which, when pulled further into the tapered bore of the anchorage member, increasingly press toward each other.

In tendon post anchorages in which only a few tendons, say two or three, are to be anchored the anchorages were constructed in the from of two wedges, each wedge extending over about 180° of the tapered bore in the anchorage member. The peripheral wall of this type of wedge anchorage must be constructed with a high degree of accuracy since even slight variations in the configuration of the wall, relative to the tapered bore in the anchorage member, can cause "bridging" or binding of the wedges which prevents the wedges from fully entering the tapered bore. This, in turn, prevents the further build up of the clamping or gripping force between the wedges, and the tendons might be torn loose from the wedges by large tension forces in the tendons. This, of course, cannot be tolerated and such tendon gripping wedges must, therefore, be constructed to close tolerances to prevent the potential danger. Manufacturing costs, however, increase correspondingly.

SUMMARY OF THE INVENTION

Briefly, the present invention provides a wedge assembly for insertion into an anchor member formed with the wall defining a convergently tapered bore over a length theerof. The bore is dimensioned at its smallest diameter to receive a plurality of tendons to be tensioned. The wedge is mountable in the bore and has a peripheral wall formed for axial sliding engagement with the bore defining wall of the anchor member in the direction of convergence of the bore. The wedge has side faces extending from the peripheral wall and tendon gripping portions formed therein and is formed for positoining in the bore with the side faces and the gripping portions, respectively, in opposed relation. The wedge includes axially oriented grooves extending from the gripping portions toward the peripheral wall and defines wedge segments to allow relative movement between the segments of the wedge. At least one such segment is further defined by two gripping portions whereby movement and force is transmitted from one tendon to another. The groove or slot provides a structure which allows flexure or hinging of the wedge between the bottom of the groove and the peripheral wall to effect an addition of gripping forces in a manner analogous to multiple wedge systems through the segment having common gripping portions.

In a presently preferred embodiment of this invention, the peripheral wall of the wedge extends over slightly less than 360° and defines a slit extending from the wall to the gripping portion. The slit and the groove in the wedge extend radially away from the axis of the anchor member.

In another preferred embodiment of this invention, a plurality, preferably two, wedges are formed for simultaneous sliding engagement with the bore in the anchor member and assembly therein. Each wedge includes at least one groove or pair of wedge side faces extending away from the gripping portion.

The groove in the wedge preferably extends over the full axial length of the wedge and is arranged so that its bottom is substantially parallel to the tapered peripheral wall of the wedge. The cross section of the wedge between the peripheral wall of the bottom of the groove thereby remains substantially constant over the full length of the wedge which provides an axially extending hinge and results in an advantageous tendon gripping force profile. The advantageous gripping profile of the axial hinge also accrue when a single tendon is to be secured, although multiplication of forces will not occur. Alternatively, the grooves may extend through to the peripheral wall over a portion of the length of the wedge to form a slot which allows for flexure.

This anchorage assembly is particularly well adapted for use in applications where relatively few, such as two or three, tendons are to be anchored, although when larger numbers of tendons are to be anchored, it similarly advantageously reduces the number of wedges required. For two or three tendons the anchorage has no more than one or two wedges which facilitates the assembly of the anchorage and reduces assembly as well as manufacturing costs. The grooves are arranged so that portions of each wedge intermediate a connecting line between centers of the tendons can flex since the cross sectional area between the groove bottom and the peripheral wall is substantially reduced. "Bridging" or premature binding of the wedge and the resultant failure to apply the full gripping force to the tendon are similarly avoided by means of the slotted or grooved wedge construction. In addition, the wedges, as well as the bore, can be constructed with greater tolerances to further reduce the costs of the anchorage.

An anchorage assembly can also be constructed in accordance with the present invention by placing relatively large numbers of tendons in intimate contact with each other between the wedges and providing each wedge with a plurality of grooves so spaced that the gripping force adding feature of the grooved wedges is retaind.

BRIEF DESCRIPTION OF THE DRAWINGS

FIG. 1 is a fragmentary end view of the tendon anchorage constructed according to the present invention;

FIG. 2 is a fragmentary view, in section, taken on line 2—2 of FIG. 1;

FIG. 3 is a view similar to FIG. 1 illustrating another form of the tendon gripping wedges;

FIG. 4 is a view similar to FIG. 3 illustrating a different construction of the tendon gripping wedges;

FIG. 5 is a view similar to FIG. 1 showing tendon wedges constructed according to the present invention and adapted to grip a multiplicity of tendons;

FIG. 6 is a view similar to FIG. 5 showing tendon gripping wedges for a lesser number of serially arranged tendons;

FIG. 7 is a view similar to FIG. 5 showing tendon gripping wedges for a multiplicity of tendons but wherein the tendons are bunched together in a plurality of sets;

FIG. 8 is a view similar to FIG. 1 showing another embodiment of the present invention;

FIG. 9 is a view similar to FIG. 1 wherein the tendon gripping wedges have external cams engaging internal cams of the anchorage member;

FIG. 10 is an elevational view, in section, taken on line 10—10 of FIG. 9;

FIG. 11 is a sectional view taken on line 11—11 of FIG. 1;

FIG. 12 is a sectional view similar to FIG. 11 but is taken on line 12—12 of FIG. 9;

DESCRIPTION OF THE PREFERRED EMBODIMENT

Figure 13:
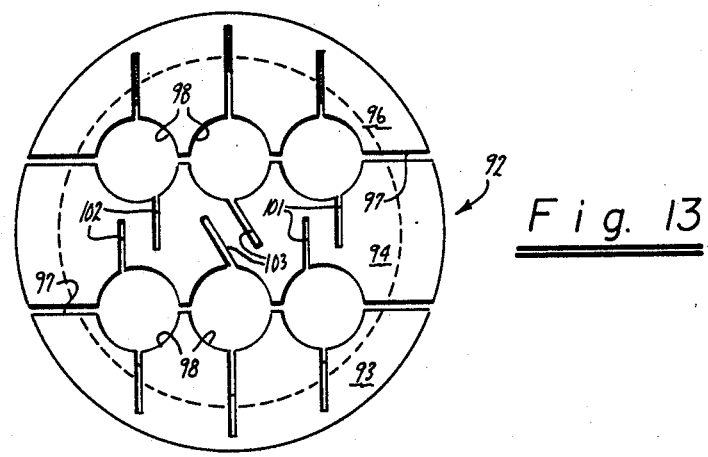
FIG. 13 is a view similar to FIG. 1 wherein the tendon gripping wedges are formed to secure a multiplicity of spaced tendons.

Referring to FIGS. 1 and 2, a tendon anchorage 16 is positioned on each end 18 of a concrete block 20 and firmly engages a pair of laterally spaced elongated and tensioned tendons 22. The tendons are tensioned in a known manner to impart maximum strength to the concrete block. The tendon anchorage comprises an anchor member 24 formed with an interior wall 26 defining a convergently tapered bore 28, the smallest transverse dimension or diameter 28a being sufficient to receive the pair of tendons 22.

Disposed within bore 28 is a wedge assembly 30 comprising a pair of opposing wedges 32 which have peripheral walls 34 of a configuration complementary to that of the bore in the anchor member. Thus, each wedge is tapered in the direction of the bore and both wedges together define a first end 36 of the wedge assembly having a greater transverse dimension or diameter and a second end 38 having a smaller transverse dimension or diameter. The wedges have side faces 40 which extend from the peripheral wall to internally or centrally disposed recessed gripping portions 42. The side faces and the gripping portions are arranged so that when the wedges are positioned in the bore, the faces and the portions, respectively, are in opposed relation to each other. Axially oriented slots or grooves 44 (the term "grooves" shall include a slot which extends through to walls 34 over part of the axial length of the wedge) extend from the gripping portions toward the peripheral wall and define wedge segments 46. When subjected to forces in a non-axial direction the segments can move relative to each other due to the weakened cross section of the wedge between bottoms 48 of the grooves and the peripheral walls.

Wedge assembly 30 is adapted to simultaneously grip a pair of laterally spaced tendons 22 and the gripping portions, which preferably extend over the full axial length of each wedge and which preferably have a configuration complementary to the periphery of the tendons, are spaced apart by a projection 50. A pair of parallel grooves 44 of rectangular cross-section transversely of the longitudinal axis of the wedge extend away from each gripping portion in each wedge and are positioned so that a projection of each groove or slot (that is, a line drawn from bottoms 48 toward and extending past portions 42) intersects the center of the tendons. The gripping portions are less than fully semi-cyclindrical, if the tendons have a cylindrical cross section, so that when tendons are disposed in the gripping portions, side faces 40 of the wedges are spaced apart to define a slit communicating with the interior of the wedges, as defined by the gripping portions.

Still referring to FIGS. 1 and 2, the concrete block 20 is pre-stressed by first inserting the pair of tendons 22 in the opening 10 in the concrete so that the ends of the tendons project past end walls 18 of the block. The wedges 32 are then placed over the tendons so that the tendons are disposed in gripping portions 42 of the wedges and an axial force of the desired magnitude is applied to the tendons by suitable tensioning means (not shown). The wedges are positioned to firmly engage both the tapered bore 28 and the tendons and, upon release of the tensioning means, the tensional force which the tendons were subjected to pulls the wedges toward the small diameter 28a end of the bore. A reactive, radially acting force is equally distributed over the peripheral walls 34 of the wedges. This reactive force biases the wedges toward each other and results in a gripping force which causes the wedge to frictionally engage the tendons. The tendons are thereby locked to anchor member 24 and the concrete block to pestress the block as desired.

Referring now to FIG. 1 and assuming momentarily that only one tendon is disposed in the gripping portion, the manner by which the anchorage of the present invention achieves an additive clamping or gripping force can be explained. First, the axially acting tension force from the tendon subjects the wedges to radial forces indicated by arows A. These forces are transmitted from the peripheral walls 34 of the wedges to the surface area of the gripping portions or recesses. The positioning of a second tendon in a second gripping portion of the wedges likewise generates radial forces. If the two wedges were solid, that is if they were constructed without the grooves 44, only those radial forces would act on the tendons which are transverse to the side faces 40 and they would evenly divide between the two tendons. Assuming both tendons to be subjected to equal tensional forces each one of them is subjected to a gripping force equal to that corresponding to the radial forces generated by it alone, since while twice the radial force is generated, it is spread over twice the surface area of the tendons to be gripped. Those radial forces which act on the wedges in a direction parallel to the side faces 40 are directly transmitted through the body of the wedges and have no affect gripping forces generated in the anchorage.

By providing grooves 44, wedge segments 46 can flex relative to each other under radial forces acting in the direction parallel to the side faces of the wedges. These forces are then transmitted from the peripheral wall through the section of the wedge between the wall and the gripping portion, thence through the first tendon to projection 50, which is part of central segment 46 and is defined by two tendon gripping portions 44, to the second tendon and back to the opposite part of the peripheral wall of the wedge. Thus, grooves 44 allow utilization of the vertical components of the radial forces A. Moreover and very importantly, the area of the tendons in the vertical direction which resists the vertical force is only one tendon in diameter, regardless of the number of tendons which are vertically aligned. Since each tendon is subjected to the total vertical force by reason of the flexure of the central segment 46, the clamping force is additive and the total gripping force per tendon is substantially increased. With increased gripping force, an increased frictional engagement between the tendons and the wedges and, therefore, a lesser chance of accidental slippage of the tendons in the gripping portion is achieved.

The important advantage of multiplication of gripping forces can also be achieved if grooves 44 are formed to extend through to peripheral wall 34 over a part of the axial length of the wedges (not shown). That is, as illustrated in FIGS. 1 and 2, grooves 44 extend laterally away from gripping portions 42 but stop or terminate short of wall 34 to provide an axially extending hinge 55. Alternatively, however, movement of the segments relative to each other can be achieved if the grooves extend through to the peripheral wall over, for example, one half of the length of the wedge. This construction may include a groove over the other half of the wedge which does not extend to the peripheral wall or may have no groove at all over some portion of the length. Such a slotted construction of the grooves eliminates the axial hinge which has highly advantageous gripping profile (set forth below), but will achieve economy of fabrication in some application and effects multiplication of gripping forces without increasing the number of wedges required.

The advantageous gripping profile of the axial hinge may be incorporated into an anchorage for a single tendon. Thus while multiplication of gripping forces is not possible with the axial hinge in a single tendon anchorage will result in a gripping profile which has its highest clamping force at the large end of the wedges and the lowest clamping forces at the small end. Such an anchorage could be constructed as shown in FIGS. 1 and 2 by removing one of the gripping portions 42 and moving the remaining gripping portion to the center of the wedges.

While tendons are tensioned and gripped by wedges 32, maximum stresses in the tendons occur in the cross sections of the tendons aligned with the second, small end 38 of the wedges. The wedges are normally constructed of a harder material than the tendon and the large gripping forces may notch the periphery of the tendons, causing stress concentrations which may result in ultimate failure of the tendon. This is particularly true if the gripping portions have teeth 51 or are serrated to increase the interengagement between the wedge and the tendon. The ideal wedge construction would have a clamping force profile or distribution of the clamping force from a maximum value adjacent end 36 of the wedges and a minimum value (preferably zero) at end 38 of the wedges. This can be approximated through the use of very long wedges, but such an approach is cumbersome and uneconomical. One technique which has been previously employed is to relieve a forward portion 52 of each gripping portion to increase its interior diameter and reduce or eliminate the effectiveness of the serrations or teeth. The intersection between the forward portion and the end face 36 of the wedge may additionally be provided with a radius 53 (see FIG. 11) to prevent possible notching from sharp edges. Thus, the gripping portions adjacent the small end 38 of the wedges is preferably smooth whereas the remainder of the gripping portions over their full axial length include serrations or teeth.

The anchorage of the present invention is constructed to further enhance the gripping profile, which may best be understood by referring to FIGS. 2 and 11. To further reduce undesirable stress concentrations adjacent the small end of the wedges, it is presently preferred that the depth of the grooves 44 increases from adjacent the small end 38 to adjacent the large end 36 of the wedges. Preferably the bottoms 48 of the groove are arranged to run substantially parallel to the peripheral wall 34 to maintain a cross sectional area 55 (shown in FIG. 11) between the bottoms of the grooves and the peripheral walls constant over the full length of the wedges. This area acts as an axially extending hinge. The radially acting forces on the peripheral wall cause bending moments in the cross section 55, which increase from adjacent the small end 38 toward the large end 36 of the wedge due to the increase in the moment arm from the slit defined by faces 40 to the groove as the wedge diameter increases. Thus, a greater deflection of hinge 55 takes place adjacent the large end of the wedge whereby radially acting forces grip the tendons with a greater additive force per unit area adjacent the large end of the wedge than adjacent the small end. This distribution of the gripping force, preferably together with the relieving of the serrated surface or teeth 51 of the gripping portions, further insures the prevention of the undesirable notching effects on the tendons adjacent the small diameter end of the wedges.

In addition to affording an additive clamping force and desirable distribution of clamping forces along the tendon, the relative flexibility of the wedge segments 46 about an imaginary axis through webbing or hinge 55 also reduces the likelihood of "bridging" or binding of the wedges in the tapered bore 28 before the tendons are fully engaged by the gripping portions. To yet further reduce the danger of bridging of the wedges, an edge 54 of each wedge at the intersection of the peripheral walls 34 and the side faces 40 may be relieved, as shown in FIG. 1.

Referring to FIGS. 1 and 3, the orientation of the grooves 44 is either parallel to each other shown in FIG. 1) or radial (shown in FIG. 3) with respect to the axis of the bore 28 in anchor member 24. The actual orientation of the grooves is dependent upon the arrangement of the tendons between the wedges 32. If the tendons are symmetrically arranged on a circle having its center coincide with the axis of bore 28 and there are a relatively large number of tendons then the grooves are preferably radially oriented relative to the axis. This spaces the grooves equally over the wedges and reduces the overall size of the latter. Where there are relatively few tendons, such as two (shown in FIG. 1), or where there are a relatively large number of tendons not all of which are radially symmetric relative to the axis of bore 28 (see FIGS. 5 and 7), then it is preferred to arrange the grooves parallel with respect to each other. This reduces the overall size of the wedge, as compared to a radially directed groove, and provides more equal wedge segments 46. In addition, it assures a large moment arm between the radial forces acting on the peripheral walls of the wedges and the cross sections 55 between the bottoms 48 of the grooves and the walls. This increases the relative flexibility of the wedges under given forces and the desired addition of gripping forces.

Although this arrangement of the grooves is the presently preferred form, as seen in the embodiments shown in FIGS. 1, 3 and 5 through 7, it is, of course, not mandatory that they be so arranged. For example, FIG. 4 shows an arrangement in which the tendons are disposed radially symmetrical about the axis of bore 28 yet the grooves or slots are parallel to each other. The wedge constructions of FIGS. 3 through 7 will not be described in detail since the numbered parts are analogous and should be easily understood by references to the drawings and the description of FIGS. 1 and 2.

Another preferred embodiment of this invention is illustrated in FIG. 8. A wedge assembly 56 comprises a single wedge which has a peripheral wall 58 extending over slightly less than 360° to define a slit 62. An interiorly disposed gripping portion 60 of the wedge assembly extends over the full length of the wedge and is divided into sections 61 by slit 62 communicating the gripping portion with the peripheral wall and a plurality of radially directed grooves 64 extending from the gripping portion toward, but ending short of, the peripheral wall. In all other respects, this wedge assembly is identical to the one shown in FIGS. 1 through 7. Its gripping portion is preferably constructed so that the gripping force is a minimum adjacent the small end of the tapered wedge and greater adjacent the large end. Consequently, the serrations (not shown in FIG. 8) or teeth of the gripping portions decrease in size or are removed adjacent the small end of the wedge. Additionally, bottoms 65 of grooves 64 are preferably parallel to the peripheral wall to increase the flexibility of the wedge sections adjacent the large end as previously discussed.

This embodiment of the invention is particularly advantageous for use with a relatively small number of tendons, say three, and has the advantage that is a one piece construction. This substantially facilitates the ease with which the anchorage assembly is installed, prevents loss of pieces, and reduces manufacturing costs.

Referring to FIGS. 9, 10 and 12, another embodiment of this invention is constructed to provide an anchorage assembly 66 which comprises an anchor member 68 supported against a face 70 of the concrete member 72. The anchor member includes an axial bore 74 which is disposed concentrically with an opening 76 in the concrete member. The bore is defined by a plurality of axially spaced cam surfaces 78 which diverge in the direction opposite to the direction in which tendons 80 are tensioned. A wedge assembly 82 is constructed identically to wedge assembly 30 or wedge assembly 56, shown in FIGS. 1 through 8, and includes gripping portions 42b and axially oriented grooves 44b for engaging the tendon and gripping it while tensioned. Bottoms 48a of the grooves are parallel to the axis of the wedge assembly 82 as shown in FIG. 12. The wedge assembly has a periphery defined by a plurality of axially spaced cam surfaces 84 which have a configuration complementary to that of the cam surfaces in the axial bore 74 of anchor member 68. The cam surfaces may be at continuous one, in which case the edges define a thread, or they may be ring shaped, both as more fully discussed and shown in the above referred to copending patent application.

This embodiment of the invention is particularly useful in instances where a stress reversal in the pre- or post-tensioned beam is possible. In such instances, the tendons are temporarily under no loads, thereby loosening the engagement between the wedges and the bore of the anchor member. If the peripheral wall of the wedges and the interior wall of the bore are constructed as a continuous taper, as shown in FIGS. 1 through 8, then such stress reversal can result in failure of the joint since the wedge assembly can fly out of the bore while no force from the tendon acts on it. Anchorage assembly 66, shown in FIGS. 9, 10, and 12 prevent such failure since the wedge assembly 82 is maintained in the axial bore 74 even if there is no tension on the tendon 80.

The small number of wedges in each wedge asembly, one in wedge assembly 56 and two in wedge assembly 30 as well as assembly 66, makes this anchorage assembly ideally suited for employing the axially spaced cam surfaces in the axial bore of the anchor member and the periphery of the wedges of each wedge assembly. Difficult aligning operations of a plurality of wedges, particularly if the cam surfaces are continuous and form a thread, during manufacture as well as during assembly are eliminated with the single wedge of assembly 56 and are substantially reduced in the case of only two wedges per assennbly. The danger of inadvertently installing a plurality of wedges in the wrong sequence, which may entail their being axially offset if the cam surfaces are a continuous thread forming cam surface, is thereby prevented. The reduction in the number of wedges through the use of the slotted wedge assembly of the present invention also insures that the gripping force which results at the end of a stress reversal, when the tendons are again under loading, is more uniform.

Figure 14:
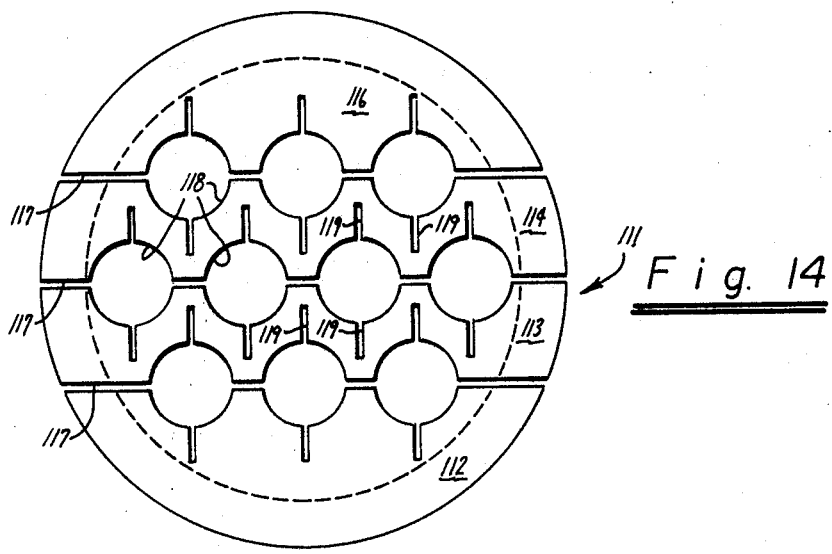
FIG. 14 is a view similar to FIG. 13 showing an alternate construction suitable for gripping a multiplicity of spaced wedges.

Referring to FIGS. 13 and 14, two further embodiments of the present invention are disclosed, both of which are well suited for securing a large number of spaced tendons. The wedge assembly 92 of FIG. 13 includes three wedges 93, 94 and 96 which have side faces defining parallel slits 97 extending from one section of the peripheral wall to another. Interior or central wedge 94 is formed with three gripping portions 98 in its opposed side faces with grooves 101, 102 and 103 extending away from each portion 98. Gripping portions 98 are vertically or transversely aligned, however, grooves 101 and 102 are transversely offset from each other so that they do not intersect yet provide the heretofore described desired flexure of the wedges. Grooves 103 are transversely offset by reason of the angles from which they extend from the gripping portions.

In FIG. 14, the wedge assembly 111 is comprised of wedges 112, 113, 114 and 116 which define slits 117. Transversely offset gripping portions 118 are formed in the side faces of the wedge and have extending substantially perpendicularly away therefrom grooves or slots 119. Thus, the multiple tendon gripping is achieved with the slotted wedge system of the present invention by offsetting the gripping portions or the grooves so that the grooves or slots in the interior wedges do not intersect. Moreover, the offsetting of grooves or gripping portion allows the wedge assembly to be more compact while still minimizing the number of wedges and achieving additive clamping forces. As can be seen in both FIGS. 13 and 14, economy of space is achieved by forming the grooves so that they overlap a common line which could be drawn to extend parallel to the side faces and between them.

By way of example as to the construction of the wedge assembly of the present invention, the anchorage illustrated in FIGS. 1 and 2 can be constructed as follows. If one-half inch bar tendons have a rated or minimum ultimate strength of 160,000 pounds per square inch or 28–31,000 pounds load are to be secured, anchor member 24 may be formed to have a 2¾ inches outside diameter with a bore of 1½ inches at the large end and about 1⅛ inches at the small end. An anchor member so dimensioned may be formed from 8620 carborized steel heat treated to a Rockwell hardness of 35–40 on the C scale. Wedges 32 may be formed from C-1117 carborized steel heat treated to a surface hardness of about 60 to 65 and a core hardness of about 35 Rockwell C. The wedge length and anchor member length are both about 2 inches. The bore taper may be between 5° to 15° for a single taper is employed and as high as 30° when a spiral or circular cam taper is used. The grooves or slots 44 may be about 3/32 of an inch in width and extend from the gripping portions to define a web 55 of about ⅛ of an inch in cross section if an axial hinge is desired. It should be noted that the width and depth of the slots can be varied in order to vary the resistance of the wedge to flexure, but the above values are highly satisfactory for the two bar anchorage. Moreover, it is an important feature of the present invention that should the anchorage fracture at web 55, there will not be a failure of the anchorage. This is true of all of the sloted wedges illustrated since fracture of the webbing merely causes the sections or segments 46 to act as independent wedges which continue to be urged against the tendons.

Tendon anchorages constructed according to this invention are compact and small in size and permit an easy, time saving installation, thereby increasing the economic feasibility of the anchorage. In addition, the advantageous addition of gripping forces found in tendon anchorages having relatively a large number of wedges are retained by virtue of the flexibility of the wedge sections.

Larger numbers of tendons can, of course, be gripped by a tendon anchorage constructed according to this invention, as shown in FIGS. 3 through 7 and 13 and 14. Moreover, in special applications in which there are several spaced-apart groups of relatively small numbers of tendons, a single mounting plate or anchor member (not shown) can be employed. Such an anchor member is provided with a plurality of bores for receiving individual wedge assemblies. This enables the tendons to be placed at the structurally most desirable position, thereby affording an opportunity to save on weight as well as on relatively complicated, expensive, large tendon anchorages.

We claim:

1. A wedge assembly for insertion into an anchor member formed with a wall defining a convergently tapered bore over a length thereof dimensioned at the smallest diameter thereof to receive a plurality of tendons to be tensioned, the assembly comprising, a wedge mountable in said bore and having a peripheral wall formed for axial sliding engagement with said bore defining wall in the direction of convergence of the said bore, said wedge having side faces extending internally from said peripheral wall and having a plurality of recessed tendon gripping portions formed in said side faces to receive a plurality of tendons to be tensioned said wedge being formed for positioning in said bore with said side faces and said gripping portions, respectively, in opposed relation, said wedge including a plurality of axially oriented grooves extending laterally away from said gripping portions said grooves and faces defining a pair of wedge segments on opposed sides of each of said gripping portions with at least one of said segments being further defined by two of said gripping portions to allow relative movement of said segments of said wedge toward each other upon mounting of said assembly in said anchor member and tensioning of said tendons.

2. Apparatus according to claim 1, wherein said grooves extend axially over the full length of said gripping portion and have their greatest depth adjacent the end of said wedge with the greatest transverse dimension.

3. Apparatus according to claim 1, wherein at least one of said grooves extends laterally away from said gripping portion and completely through to said peripheral wall to form a slot over less than the entire axial length of said wedge.

4. Apparatus according to claim 3, wherein said groove extending through to said peripheral wall is formed over the remaining portion of said wedge to a depth short of said peripheral wall.

5. Apparatus according to claim 1, including a plurality of wedges formed for simultaneous sliding engagement with said bore, said wedges being defined in part by side faces interiorly of the peripheral wall of said assembly of wedges and wherein each of said wedges includes at least one recessed tendon gripping portion and an axially oriented groove extending away from each said gripping portion to define a pair of wedge segments.

6. Apparatus according to claim 5, wherein said side faces define a slit over the length of said wedge extending from said peripheral wall to said gripping portion and said slit and said grooves upon mounting in said bore extend radially away from the longitudinal axis of said anchor member.

7. Apparatus according to claim 5, wherein each of said wedges are formed with a plurality of gripping portions and a plurality of grooves and said grooves are parallel with respect to each other and the longitudinal axis of said bore in said anchor member upon mounting of said wedges therein.

8. Apparatus according to claim 5, wherein at least three wedges are provided including an interior wedge defined by at least two parallel slits formed by said side faces and extending from one section of said peripheral wall to another section of peripheral wall, said interior wedge being formed with at least one gripping portion in each opposed side face and a groove extending away from each gripping portion.

9. Apparatus according to claim 8 wherein said gripping portions and grooves are disposed so that said grooves overlap a common line extending parallel to said opposed side faces and therebetween without intersecting any other groove.

10. Apparatus according to claim 8, wherein said gripping portions formed in one of said opposed side faces of said interior wedger are transversely offset from gripping portions formed in the other of said side faces of said interior wedge and said grooves extend substantially perpendicularly from said gripping portions.

11. Apparatus according to claim 8 wherein said gripping portions in said opposed side faces of said interior wedge are transversely aligned and said grooves are transversely offset from each other.

12. A tendon anchorage according to claim 1, wherein said peripheral wall extends over slightly less than 360° and said gripping portion is divided by said side faces and a plurality of radially disposed grooves.

13. Apparatus according to claim 1 wherein the bottom of said grooves are substantially parallel to said peripheral wall.

14. Apparatus according to claim 5 wherein said gripping portions each simultaneously engage a plurality of tendons and said grooves and said side faces are arranged so that each tendon in engagement with a gripping portion is positioned over a groove or an adjacent opposed side faces forming a slit.

15. Apparatus according to claim 5, and a member with an interior wall defining a convergently tapered bore over a length thereof, the smallest transverse dimension of said bore being sufficient to receive a plurality of tendon to be tensioned, said assembly being mounted in said bore.

16. A tendon anchorage comprising:
(a) an anchor member with an interior wall defining a convergently tapered bore over a length thereof, the smallest transverse dimension of said bore being sufficient to receive a plurality of tendons to be tensioned, and
(b) a wedge having a peripheral wall complementary to said interior wall to permit slideable engagement in an axial direction of said bore between said walls mounted in said bore, said wedge defining a plurality of recessed tendon gripping portions and a slit defined by side faces of said wedge extending from said peripheral wall to one of said gripping portions and at least one groove extending from each of the remaining gripping portions said slit and grooves defining a pair of edge segments on opposed sides of each of said gripping portions with at least one of said segments being further defined by two of said gripping portions to allow increased relative flexure of said segments under forces acting in radial directions relative to the longitudinal axis of said wedge upon tensioning of said tendons.

17. Apparatus according to claim 16 wherein said interior and said peripheral walls each include a plurality of axially spaced cams having interengageable tapered interior and peripheral surfaces.

18. A wedge assembly for insertion into an anchor member formed with a wall defining a convergently tapered bore over a length thereof dimensioned at the smallest diameter thereof to receive at least one tendon to be tensioned, the assembly comprising, a wedge mountable in said bore and having a peripheral wall formed for axial sliding engagement with said bore defining wall in the direction of convergence of the said bore, said wedge having side faces extending internally from said peripheral wall and having a tendon gripping portion formed in said side faces to receive a tendon to be tensioned, said wedge being formed for positioning in said bore with said side faces and said gripping portions, respectively. in opposed relation, said wedge including at least one axially oriented groove extending laterally away from said gripping portion, said groove and faces defining a pair of wedge segments on opposed sides of said gripping portions to allow relative movement of said segments of said wedge toward each other upon mounting of said assembly in said anchor member and tensioning of said tendon.

References Cited

UNITED STATES PATENTS

| | | | |
|---|---|---|---|
| 1,620,029 | 3/1927 | Kearney | 24—125 X |
| 1,852,381 | 4/1932 | Teas | 24—263.5 X |
| 2,763,464 | 9/1956 | Leonttardt | 52—230 X |
| 3,449,876 | 6/1969 | Howlett | 24—122.6 X |

FOREIGN PATENTS

| | | |
|---|---|---|
| 274,675 | 7/1927 | Great Britain. |
| 265,844 | 4/1964 | Australia. |
| 1,250,101 | 9/1967 | Germany. |
| 1,271,960 | 7/1968 | Germany. |

J. KARL BELL, Primary Examiner

U.S. Cl. X.R.

52—230

UNITED STATES PATENT OFFICE
CERTIFICATE OF CORRECTION

Patent No. 3,520,032          Dated July 14, 1970

Inventor(s) G. H. Howlett et al

It is certified that error appears in the above-identified patent and that said Letters Patent are hereby corrected as shown below:

Column 2, line 20, change "theerof" to ---thereof---.

Column 5, line 25, change "advantage" to ---advantages---.

Column 5, line 42, change "application" to ---applications---.

Column 6, line 47, after "other" insert ---(---.

Column 7, line 29, after "that" insert ---it---.

Column 7, line 51, change "at" to ---a---.

Column 10, line 63, change "edge" to ---wedge---.

Column 11, line 11, change "." after "respectively" to

---,---.

SIGNED AND
SEALED
FEB 2 1971

(SEAL)
Attest:

Edward M. Fletcher, Jr.
Attesting Officer

WILLIAM E. SCHUYLER, JR.
Commissioner of Patents